US010833999B2

(12) United States Patent
Yeom et al.

(10) Patent No.: US 10,833,999 B2
(45) Date of Patent: Nov. 10, 2020

(54) ACTIVE REQUEST MANAGEMENT APPARATUS IN STATEFUL FORWARDING NETWORKS AND METHOD THEREOF

(71) Applicant: RESEARCH & BUSINESS FOUNDATION SUNGKYUNKWAN UNIVERSITY, Suwon-si (KR)

(72) Inventors: Ikjun Yeom, Suwon-si (KR); Sugi Lee, Suwon-si (KR); Yusung Kim, Suwon-si (KR); Younghoon Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/216,283

(22) Filed: Dec. 11, 2018

(65) Prior Publication Data

US 2019/0245788 A1    Aug. 8, 2019

(51) Int. Cl.
*H04L 12/801* (2013.01)
*H04L 12/841* (2013.01)
(Continued)

(52) U.S. Cl.
CPC ............ *H04L 47/127* (2013.01); *H04L 47/25* (2013.01); *H04L 47/283* (2013.01); *H04L 47/323* (2013.01)

(58) Field of Classification Search
CPC ... H04L 47/127; H04L 47/283; H04L 47/323; H04L 47/25; H04L 45/12; H04L 45/18;
(Continued)

(56) References Cited

U.S. PATENT DOCUMENTS 7,032,048 B2 * 4/2006 Appleby ............ H04L 67/1008
370/230
2006/0143293 A1 * 6/2006 Freedman ............... H04L 45/02
709/225
(Continued)

FOREIGN PATENT DOCUMENTS

KR    10-2014-0030307 A    3/2004
KR    10-2013-0093812 A    8/2013
(Continued)

OTHER PUBLICATIONS

Zhang, Lixia et al., "Named Data Networking", *ACM SIGCOMM Computer Communication Review (CCR)*, vol. 44, No. 3, Jul. 2014 (pp. 66-73).
(Continued)

*Primary Examiner* — Jung Liu
(74) *Attorney, Agent, or Firm* — NSIP Law

(57) ABSTRACT

Disclosed herein are a packet management apparatus and method. The packet management apparatus includes: a traffic prediction unit configured to predict the amount of data traffic to be generated based on the number of forwarding information items present in a pending interest table (PIT); and a proactive congestion control unit configured to probabilistically drop request packets (interests) based on the amount of data traffic predicted by the traffic prediction unit. The packet management method includes the steps of: (a) predicting, by a traffic prediction unit, the amount of data traffic to be generated based on the number of forwarding information items present in a pending interest table (PIT); and (b) probabilistically dropping, by a proactive congestion control unit, request packets based on the amount of data traffic predicted by the traffic prediction unit.

9 Claims, 23 Drawing Sheets

(51) Int. Cl.
*H04L 12/823* (2013.01)
*H04L 12/825* (2013.01)

(58) Field of Classification Search
CPC ... H04L 45/245; H04L 45/306; H04L 45/021; H04L 45/122; H04L 45/38; H04L 12/1863; Y02D 70/26; H04W 72/04
See application file for complete search history.

(56) References Cited

U.S. PATENT DOCUMENTS

| | | | | |
|---|---|---|---|---|
| 2007/0050521 | A1* | 3/2007 | Grove | H04L 29/12018 709/246 |
| 2013/0041982 | A1* | 2/2013 | Shi | H04L 67/1089 709/217 |
| 2014/0198641 | A1* | 7/2014 | Perkuhn | H04L 67/322 370/230 |
| 2014/0372624 | A1* | 12/2014 | Wang | H04L 65/60 709/231 |
| 2015/0124617 | A1* | 5/2015 | Luna | H04W 28/0215 370/235 |
| 2015/0156279 | A1* | 6/2015 | Vaswani | H04L 67/42 709/203 |
| 2016/0044125 | A1* | 2/2016 | Hardin | H04L 67/2823 709/219 |
| 2017/0093691 | A1* | 3/2017 | Garcia-Luna-Aceves | H04L 45/12 |
| 2019/0327683 | A1* | 10/2019 | Luna | H04W 52/0229 |

FOREIGN PATENT DOCUMENTS

| | | |
|---|---|---|
| KR | 10-2014-0030307 A | 3/2014 |
| KR | 10-2016-0144257 A | 12/2016 |

OTHER PUBLICATIONS

Kim, Yusung et al., "Differentiated forwarding and caching in named-data networking", *Journal of Network and Computer Applications*, vol. 60, Jan. 2016 (pp. 155-169).

Korean Office Action dated Nov. 14, 2018 in counterpart Korean Application No. 10-2017-0076395 (4 pages in Korean).

Zhang, L., et. al, "Named Data Networking", *ACM SIGCOMM Computer Communication Review*, Jul. 2014, pp. 66-73, vol. 44, Issue 3 (9 pages in English).

Kim, Yusung, et. al, "Differentiated forwarding and caching in named-data networking", *Journal of Networking and Computer Applications*, 2016, pp. 155-169, vol. 60 (15 pages in English).

* cited by examiner

FIG. 7

Algorithm 1 Forwarding Request Packets
1: procedure HANDLE REQUEST($req$)
2:     $f \leftarrow next\_rank\_interface(req)$
3:     try forwarding $req$ to $f$
4:     while $req$ is dropped do
5:         $f \leftarrow next\_rank\_interface(req)$
6:         if $f$ exists then
7:             retry forwarding $req$ to $f$
8:         else
9:             generate NACK
10:             break
11:         end if
12:     end while
13: end procedure

FIG. 8

Algorithm 2 Receiving NACK Packets

1: procedure HANDLE NACK
2:     $r\_f \leftarrow retry\_interfaces(NACK)$
3:     if $r\_f$ are exist then
4:         $req \leftarrow get\_from\_PIT(NACK)$
5:         HANDLE REQUEST($req$)
6:     else
7:         generate NACK
8:     end if
9: end procedure

ACTIVE REQUEST MANAGEMENT APPARATUS IN STATEFUL FORWARDING NETWORKS AND METHOD THEREOF

BACKGROUND

1. Technical Field

The present invention relates generally to a packet management apparatus and method, and more specifically to an active request management apparatus and method for a stateful forwarding network.

2. Description of the Related Art

Networks today perform data transmission based on inter-host interconnections by using IP addresses. However, in recent traffic patterns, the transmission of massive multimedia content is increased and repetitive requests for popular content are frequently made. When such traffic patterns are processed, the repetitive transmission of the same data packets frequently occurs in an IP address-based network, and thus the IP address-based network operates considerably inefficiently.

A new network architecture that is proposed to overcome the above problem is content-centric networking (CCN). CCN is currently being researched in many network companies because its performance is acknowledged. In particular, CISCO has developed and released a commercial CCN router, and is conducting active research on CCN by recruiting world-renowned CCN experts and forming a CCN research team.

CCN is designed to allocate a hierarchical name having a prefix to data and to perform data transmission based on the name. A content consumer of CCN requests and receives a desired data packet by transferring a request packet (interest), having the same name as a data packet, to a content producer. In order to support the above communication method, a CCN router utilizes network state information stored in a Forwarding Information Base (FIB), a Pending Interest Table (PIT), and a Content Store (CS). The FIB manages per-prefix routing information. A prefix refers to the prefix of a content name. Data packets that constitute a specific piece of content have the same prefix. The router searches for routing information by matching the name of a received request packet against prefix information present in an FIB, and forwards the request packet according to the corresponding information. When a request packet is forwarded, information about an interface via which the corresponding request packet enters as well as the name of the request packet to be forwarded are recorded in a PIT. Thereafter, the corresponding information functions to provide a path to a content consumer to a data packet that is generated from a content producer. The PIT items used by the data packet are deleted after the corresponding data packet has been transmitted, and the transmitted data packet is copied to the CS, functioning as an in-network cache, for a predetermined time. This reduces unnecessary data packet transmission from the content producer by allowing a corresponding data packet to be provided directly from the CS of a router upon repeated requests for the corresponding data packet. In addition, a router of CCN supports a request packet aggregation function by utilizing information present in a PIT. The corresponding function aggregates repetitive request packets (interests) having the same name, generated within a short time, into one request packet, and allows a PIT to record and manage corresponding information. In addition, when a data packet corresponding to the aggregated request packet is transmitted to the router, repetitive request packet and data packet transmission can be effectively prevented by transmitting a multicast to content consumers according to the information recorded in the PIT.

In the present specification, a method of storing and managing forwarding information in a router when performing packet forwarding in CCN, as described above, is defined as "stateful forwarding." Stateful forwarding is a feature considerably differentiated from the features of an existing IP-based network. The existing IP-based network stores and manages network state information in an FIB in the same manner as CCN in the case of routing, but relies on only routing information without managing any piece of information when forwarding packets. This "stateful packet forwarding method" has the advantage of reducing the load of a router by simplifying packet forwarding, but has the disadvantage of not responding quickly to a real-time network failure and real-time congestion because routing information is updated in very long cycles. However, in CCN that performs stateful forwarding, a router can easily measure delayed round-trip time and throughput for a specific prefix by monitoring a PIT adapted to manage forwarding information, and can rapidly detect a network failure and congestion by utilizing the measured information. In addition, the router can effectively respond to congestion by transmitting a request packet via a different transmission path based on detected information. This function naturally allows CCN to support multipath transport, and also allows multipath transport to be provided for a single content producer or a plurality of content producers because stateful forwarding does not require specific connections between content producers and content consumers during request packet transmission.

Meanwhile, although various technologies have been proposed in the field of CCN congestion control, three representative technologies will be analyzed below.

A first technology is the Interest Control Protocol (ICP). ICP is a technology in which a content consumer measures the delayed round-trip time of a data packet and detects congestion based on the measured information. In this technology, when the data packet is not returned until a measured average delayed round-trip time elapses after being transmitted, the content consumer determines that the data packet is lost due to network congestion and retransmits the request packet for loss recovery, thereby handling the network congestion. Furthermore, the content consumer who detects congestion reduces his or her request packet transfer rate. In this case, the request packet transfer rate is managed by means of an Additive Increase Multiplicative Decrease (AIMD) method used in an existing TCP/IP network. ICP is a technology by which a congestion control technology used in the existing TCP/IP network is applied to CCN. However, since CCN performs stateful forwarding, unlike a TCP/IP network, there may be a number of content producers for specific content, or a router may generate a data packet using CS. Accordingly, even when data packets belong to the same content transmission, delayed round-trip times are significantly various. Therefore, it is not accurate to control congestion based on delayed round-trip time measurement at a termination. In addition, ICP has a loss recovery delay problem. The corresponding problem is a problem that occurs because a process in which a CCN router maintains request packet forwarding records in a PIT for a specific time in order to aggregate request packets conflicts with a process in which content consumers of ICP retransmit request packets for data packet loss recovery.

FIG. 1 is a reference view showing a process in which a loss recovery delay problem occurs in ICP.

Referring to FIG. 1, when a data packet loss occurs after a request packet has been transmitted from a content consumer, the corresponding content consumer detects congestion based on delayed round-trip time and retransmits a request packet. Meanwhile, in general, a router stores request packet information in a PIT for a time considerably longer than the average delayed round-trip time of a network in order to effectively aggregate request packets generated via various paths and to ensure the transmission of data packets, so that retransmitted request packets are aggregated in the PIT of the router, and thus normal loss recovery is not performed. Furthermore, as a result, the ICP content consumer can normally perform loss recovery only after the request packet information stored in the PIT has expired and has been deleted. The corresponding problem increases the transmission completion time of content, which considerably reduces the transmission performance of small content having a considerably short transmission completion time.

A second technology is the Hop-by-Hop Interest Shaping (HIS). HIS performs congestion control independently for each router, and explicitly notifies a network of the occurrence of congestion by using negative-acknowledgement (NACK) packets.

FIG. 2 is a conceptual diagram showing the structure of HIS.

Referring to FIG. 2, when forwarding request packets, a HIS router calculates a request packet transfer rate by using the bandwidth of a link and an average data packet size, as shown in Equation 1 below, paces request packets in accordance with the corresponding transfer rate, and then transmits the request packets.

$$s = \frac{c}{\text{avg\_size}_{data}} * \text{avg\_size}_{interest} \qquad (1)$$

The HIS router uses a request queue to store the paced request packets, determines that network congestion has occurred when the corresponding request queue is full, and then notifies a previous hop router of the occurrence of network congestion by generating a NACK packet. The NACK packet generated as described above is transmitted to a content consumer while consuming request packet forwarding information, present in a PIT, in the same manner as a data packet. The content consumer having received the NACK packet controls congestion by reducing his or her request packet transfer rate and then retransmitting request packets. HIS solves the loss recovery delay problem in ICP by removing PIT items for lost data packets by using NACK packets, and performs highly effective congestion control in a single path environment. However, HIS has a problem in that it does not support multipath transport. This problem is present in ICP.

A technology to be described finally is Adaptive Forwarding (AF) that supports multipath transport while performing congestion control for each router by means of NACK packets. AF calculates an appropriate request packet transfer rate at a router, paces request packets in accordance with the transfer rate, and then transmits the request packets in the same manner as HIS. In addition, AF provides multipath transport by means of the following method. First, a router searches for available interfaces connected to content producers, and ranks the corresponding interfaces by taking into account routing preferences. Furthermore, the router adjusts the ranks of the interfaces in real time while monitoring data transmission performance (delayed round-trip time, throughput, and/or the like). This interface ranking information is used as a criterion for the selection of a path via which the AF router will try transmission first when performing multipath transport. Furthermore, the AF router manages the upper limit value of a request packet transfer rate in a per-interface-per-prefix manner. The corresponding value is managed by means of an AIMD method, and increases when data packet transmission succeeds and decreases when a NACK packet is generated. When the per-interface-per-prefix request rate corresponding to request packets exceeds the upper limit value while the router is transmitting the request packets having a specific prefix to a specific interface, the router utilizes multiple paths by transmitting the request packets having the corresponding prefix to a path connected to a next-rank interface rather than transmitting the request packets having the corresponding prefix to the corresponding interface. When there is no additional available interface, the router determines that this situation corresponds to congestion, and transmits a NACK packet to the previous hop router. The router having received the NACK packet reduces the upper limit value of a transfer rate corresponding to the interface via which the NACK packet has entered and the corresponding prefix. In addition, the router checks whether there is another available interface, and, when there is another available interface, generates a request packet corresponding to the NACK packet and retries forwarding to the available interface. In the same manner, when there is no available interface, a NACK packet is transmitted.

FIG. 3 is a conceptual diagram of the structure of the multipath transport of AF.

FIG. 3(a) shows a process in which a router processes request packets, and FIG. 3(b) shows a process in which the router processes a NACK packet. AF is the technology that operates effectively in both single path and multipath environments without suffering from a loss recovery delay problem in such a manner as to control congestion by means of NACK packets. Meanwhile, AF performs pacing in the same manner as HIS, and thus has the problem of imposing a heavy load on routers in that request queues are additionally required and a network state needs to be managed in a per-interface-per-prefix manner.

PRIOR ART DOCUMENT

Patent Document

Patent document 1: Korean Patent No. 10-1705464

SUMMARY

An object of the present invention is to provide a packet management apparatus and method capable of congestion control, which effectively provide single path transport and multipath transport by maximally utilizing the stateful forwarding feature of CCN without requiring the installation of additional queues or a heavy load from a router.

The objects of the present invention are not limited to the above-described objects, and other objects that have not been described will be readily apparent to those skilled in the art from the following description.

According to an aspect of the present invention, there is provided a packet management apparatus for functioning as a router in content-centric networking (CCN), the packet management apparatus including: a traffic prediction unit configured to predict the amount of data traffic to be generated based on the number of forwarding information items present in a pending interest table (PIT); and a proactive congestion control unit configured to probabilistically drop request packets based on the amount of data traffic predicted by the traffic prediction unit.

The proactive congestion control unit may generate a NACK packet when dropping the request packets in the router.

The proactive congestion control unit may generate a NACK packet when there is no interface available for forwarding.

When receiving the NACK packet, the proactive congestion control unit may generate a request packet corresponding to the corresponding NACK packet, and may forward the generated request packet to an interface having a rank next to the rank of an interface via which the NACK packet has entered.

The proactive congestion control unit may drop the request packets based on the service classes of the request packets in a differentiated probabilistic manner.

The traffic prediction unit may set the value of a PIT base size based on the delayed round-trip times of data packets.

According to another aspect of the present invention, there is provided a packet management method for controlling a router in content-centric networking (CCN), the packet management method including the steps of: (a) predicting, by a traffic prediction unit, the amount of data traffic to be generated based on the number of forwarding information items present in a pending interest table (PIT); and (b) probabilistically dropping, by a proactive congestion control unit, request packets based on the amount of data traffic predicted by the traffic prediction unit.

The packet management method may further include the step of: (c) generating, by the proactive congestion control unit, a NACK packet after dropping the request packets in the router.

Step (c) may include the step of generating, by the proactive congestion control unit, a NACK packet when there is no interface available for forwarding.

The packet management method may further include the step of: (d) when receiving the NACK packet, generating, by the proactive congestion control unit, a request packet corresponding to the corresponding NACK packet and forwarding, by the proactive congestion control unit, the generated request packet to an interface having a rank next to the rank of an interface via which the NACK packet has entered.

Step (b) may include the step of dropping, by the proactive congestion control unit, the request packets based on the service classes of the request packets in a differentiated probabilistic manner.

Step (a) may include the step of setting, by the traffic prediction unit, the value of a PIT base size based on the delayed round-trip times of data packets.

According to another aspect of the present invention, there is provided a computer program written to execute the steps of the packet management method on a computer and stored on a computer-readable storage medium.

BRIEF DESCRIPTION OF THE DRAWINGS

The above and other objects, features, and advantages of the present invention will be more clearly understood from the following detailed description taken in conjunction with the accompanying drawings, in which:

FIG. 7 is a view showing a process in which a proactive congestion control unit according to the present invention processes request packets in a router;

FIG. 8 is a view showing the operation of the router in which the proactive congestion control unit according to the present invention has received a NACK packet;

DETAILED DESCRIPTION

Embodiments of the present invention will be described in detail below with reference to the accompanying drawings so that those having ordinary knowledge in the art to which the present invention pertains can easily practice the present invention. As can be understood by those having ordinary knowledge in the art to which the present invention pertains, the following embodiments may be modified in various forms without departing from the technical spirit and scope of the present invention. Throughout the accompanying drawings, the same or similar components are designated by the same or similar reference symbols as much as possible.

The terms used herein are used merely to describe specific embodiments, and are not intended to limit the present invention. Each singular expression used herein may include a plural expression unless clearly defined otherwise.

The term "include" or "comprise" used herein specifies a specific feature, region, integer, step, operation, element, or component, but does not exclude the presence or addition of a different specific feature, region, integer, step, operation, element, component, or group.

All terms including technical terms and scientific terms used herein have the same meanings as commonly understood by those having ordinary knowledge in the art to which the present invention pertains. Terms defined in commonly used dictionaries should be interpreted as having meanings consistent with relevant art documents and the present disclosure, and should not be interpreted in an ideal or overly formal sense unless expressly so defined herein.

The present invention provides per-content differentiated services by setting different request packet (interest) probabilities for respective classes in such a manner as to utilize the class information of content distributed over a network by a content producer by means of a routing protocol.

A packet management system and method according to the present invention will be described in conjunction with the accompanying drawings. Meanwhile, in the following description of the present invention, a detailed description of conventional CCN will be omitted, and a description will be given with a focus on differences with respect to the conventional CCN.

Figure 1:
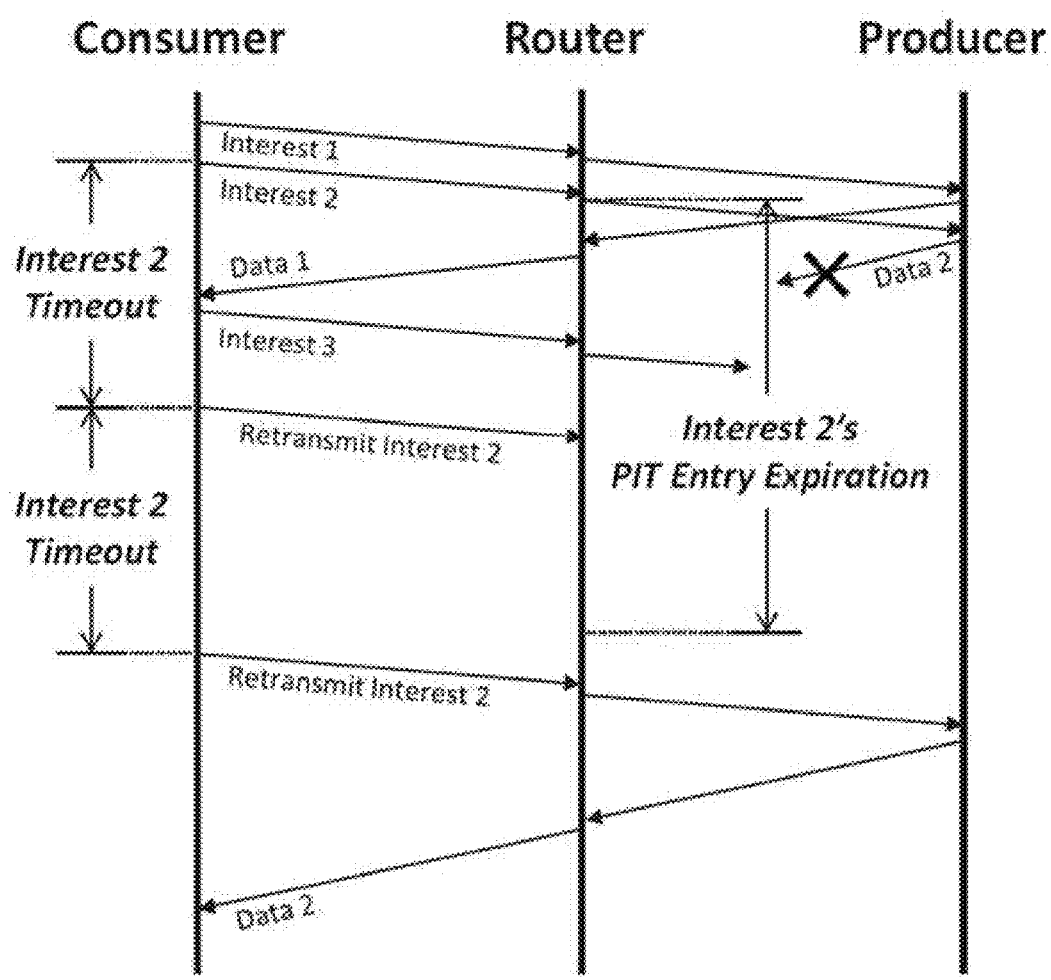
FIG. 1 is a reference view showing a process in which a loss recovery delay problem occurs in ICP.
Figure 2:
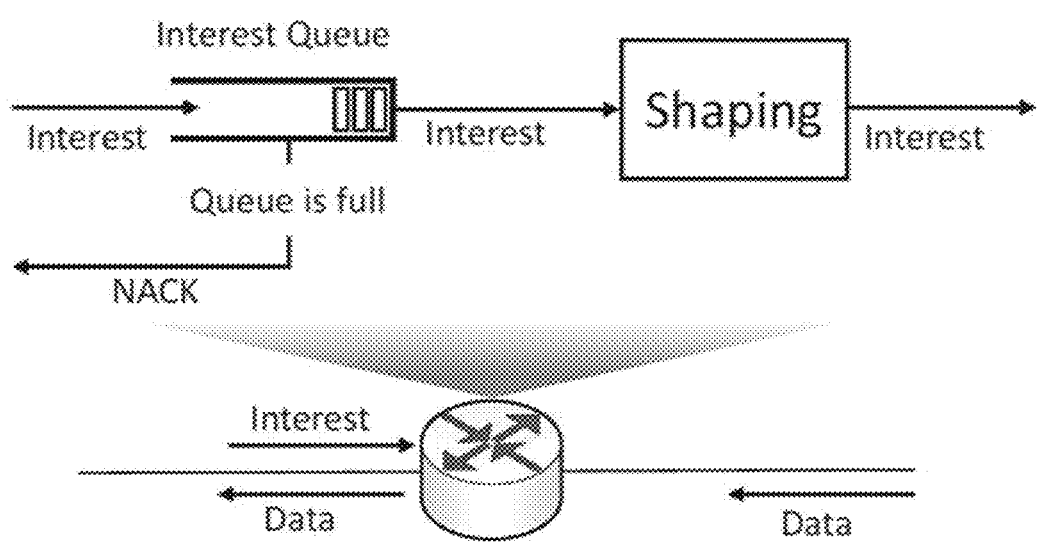
FIG. 2 is a conceptual diagram showing the structure of HIS.
Figure 3:
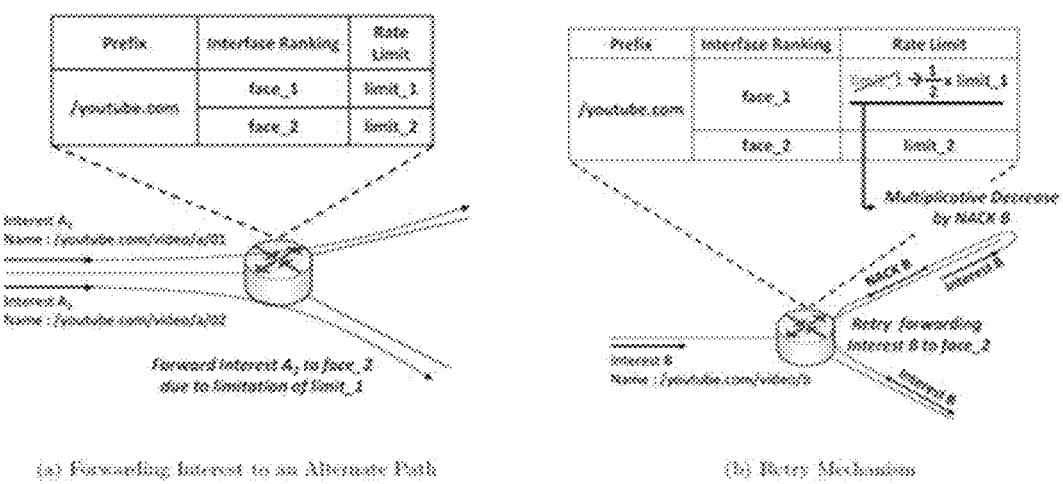
FIG. 3 is a conceptual diagram of the structure of the multipath transport of AF.
Figure 4:
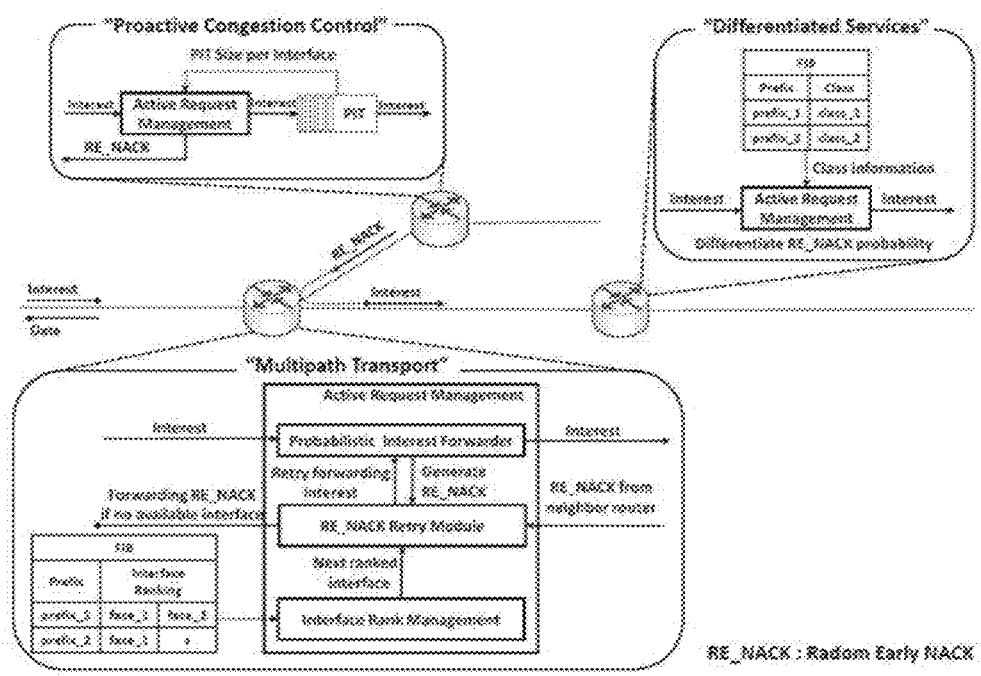
FIG. 4 is a schematic conceptual diagram of a system including a packet management apparatus according to the present invention.

FIG. 4 is a schematic conceptual diagram of a system including a packet management apparatus according to the present invention.

<Proactive Congestion Control>

In CCN, one data packet is always generated for one request packet (interest), and each router stores and manages the information of a forwarded request packet in a PIT. Therefore, when information about the size of the PIT (the number of forwarding information items present in the PIT) is used, the amount of data traffic that will be generated in the future may be predicted. The present invention proposes a proactive congestion control technology that may prevent network congestion in advance by using the above characteristic. In the present invention, a router performs proactive congestion control by measuring the size of a PIT for each interface and then probabilistically dropping request packets based on the size of the PIT before the occurrence of network congestion. When dropping request packets, the router generates a NACK packet and notifies a content requestor of the dropping of the request packets so that the dropped request packets can be retransmitted.

Figure 5:
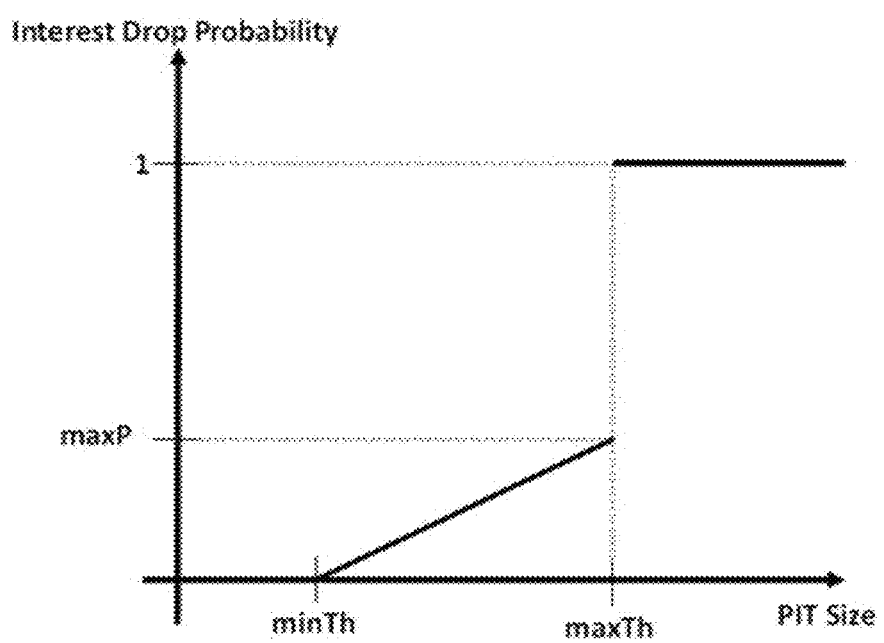
FIG. 5 shows a probabilistic model for request packet drops.

FIG. 5 shows a probabilistic model for request packet drops.

Referring to FIG. 5, the corresponding probabilistic model is similar to the probabilistic model that is used in the RED of TCP. When the current size of a PIT is smaller than minTh, all request packets are forwarded without being dropped.

However, when the size of the PIT is larger than minTh, request packets are probabilistically dropped. In contrast, when the size of the PIT is larger than maxTh, all request packets are dropped. minTh and maxTh are calculated as shown in Equations 2 and 3:

$$\min Th = (1+\alpha)*\text{base\_size} \quad (2)$$

$$\max Th = (1+2\alpha)*\text{base\_size} \quad (0 \leq \alpha \leq 1) \quad (3)$$

α is a configurable parameter, and base_size is the size of a PIT with which a network link can be most ideally used. When the size of the PIT is maintained at base_size, it may be possible to perform data transmission in the state where the bandwidth of a link is fully occupied while minimizing the utilization of a network queue. A base_size calculation method will be described later. The present invention is different from IS and AF, which are conventional technologies, in that proactive congestion control is performed without the installation of additional queues for request packet pacing.

<Data Transmission Utilizing Multiple Paths>

The present invention performs data transmission fully utilizing multiple paths by using an algorithm similar to that of AF. In the present invention, a router ranks available interfaces by taking into account network conditions, and manages the interfaces by using ranks. Furthermore, the present invention supports multipath data transport by allowing a router to perform specific operations when processing a request packet and a NACK packet, respectively.

When the forwarding of a request packet to a specific interface fails due to a random drop, the router checks whether there is another available interface before generating a NACK packet, and then tries to transmit the request packet to the highest rank interface when there is another available interface. This operation is repeated until the forwarding of the request packet to a specific interface succeeds or there is no more available interface. When there is no available interface, the router generates a NACK.

Thereafter, a router having received the NACK packet operates as follows:

The router generates a request packet corresponding to the NACK packet, and retries forwarding to interfaces having immediately lower ranks than the interface via which the NACK packet is received. In the same manner, this operation is also repeated until the forwarding of the request packet succeeds or there is no more available interface. When there is no available interface, a NACK packet is transferred to a next hop. The present invention is similar to AF in terms of an overall mechanism for the utilization of multiple paths, but is different from AF in that the present invention does not manage a network state in a per-interface-per-prefix manner and can thus operate without imposing a considerable load on a router.

<Content Producer-Led Differentiated Services>

The general differentiated services in the existing IP-based network are applied to respective flows, and operate in such a manner that edge routers perform complicated tasks, such as flow classification and classification information marking, and a core router simply performs differentiated packet forwarding based on the classified information.

The present invention provides not only per-flow based differentiated services led by the edge routers but also differentiated services led by a content producer, which is a new differentiated service method. Basically, in CCN, a content producer distributes routing information together with the prefix of a content name over an overall network by means of a routing protocol. By using this, the present invention provides differentiated services in such a manner that a content producer also transmits the service class information of corresponding content when distributing routing information and a router forwards packets in a differentiated manner based on the class information. The router manages the routing information and the service class information for each prefix in an FIB. This does not impose a heavy load on the router because the CCN router already manages routing information for each prefix in the FIB.

Figure 6:
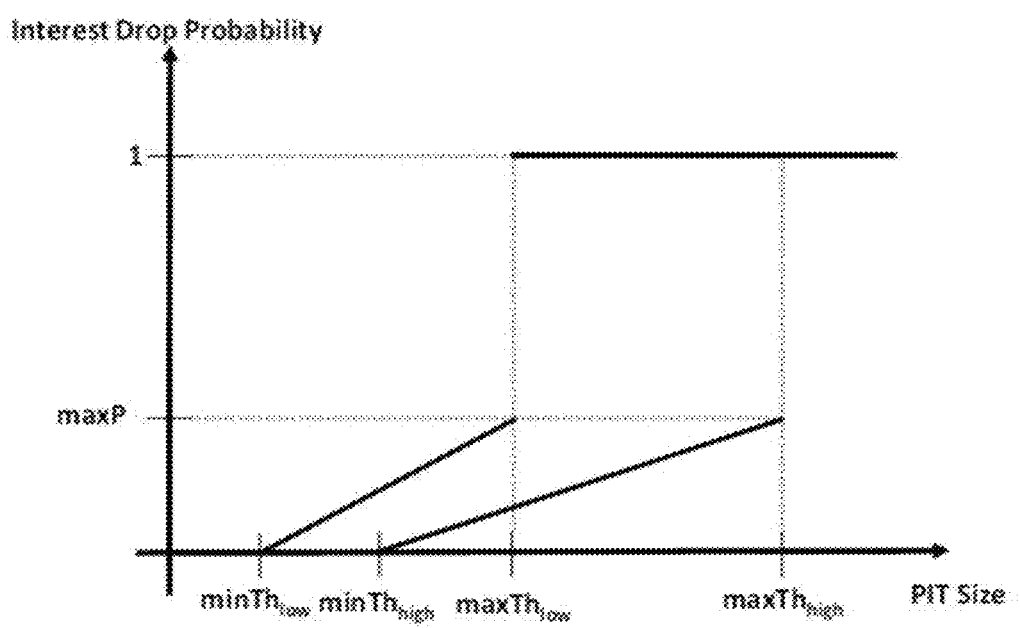
FIG. 6 is a view showing an example of packet drop probabilities for service classes.

FIG. 6 is a view showing an example of packet drop probabilities for service classes.

A router differentiates request packet forwarding by applying a different interest drop probability according to corresponding class information. For example, the interest drop probabilities when service classes include two types (a high class with a low priority and a low class with a high priority) are shown in FIG. 6. minTh and maxTh have different values for each class. Based on this, relatively large minTh and maxTh are applied to high class content items during request packet drops, and thus a smaller number of request packets are dropped than low class content items, thereby enabling differentiated packet forwarding to be applied. Equations (4) and (5) are equations that are used to calculate minTh and maxTh for each class.

$$\min Th_{class} = (1+\beta_{class})*\min Th \quad (4)$$

$$\text{Max} Th_{class} = (1+\beta_{class})*\max Th \quad (5)$$

In these equations, $\beta_{class}$ is a per-class differentiation variable, and is calculated by Equation 6 below:

$$\beta_{class} = \begin{cases} \beta_{class} + \min(\gamma, \delta) & (\gamma \geq 0) \\ \beta_{class} + \max(\gamma, -\delta) & (\gamma < 0) \end{cases} \quad (6)$$

γ is calculated by Equation 7 below, where $objThro_{class}$ is a target throughput required for a corresponding class and $curThro_{class}$ is a throughput for the corresponding class, which is measured by the router.

$$\gamma = \frac{objThro_{class} - curThro_{class}}{objThro_{class}} \quad (7)$$

$objThro_{class}$ is set when a content producer distributes class information. When necessary, $objThro_{class}$ may be set directly by a network administrator. γ increases minTh and maxTh by increasing $\beta_{class}$ for a specific class when a throughput for the corresponding class is smaller than a target throughput. Additionally, in the present invention, in order to prevent a rapid variation in $\beta_{class}$ for stable operation, the maximum value of γ is set to a configurable parameter δ, and $\beta_{class}$ is prevented from being varied before the throughput of the corresponding class converges to a predetermined level after the application of the new $\beta_{class}$. The differentiated service provided by the present invention is differentiated in that it can be easily provided without requiring a specific router to classify request packets according to their flow and mark the request packets.

<PIT Base Size>

The PIT base size is an important factor that highly influences the performance of the present invention. In order to sufficiently utilize network link bandwidth in the present invention, the PIT base size, which is a criterion for request packet drops, needs to be set to an appropriate value. In the present invention, the PIT base size is defined as a PIT size when a network link is most ideally used. Furthermore, the case of utilizing the overall network bandwidth while maximally utilizing a network queue is defined as an environment in which the network link is most ideally used. Generally, the value of the PIT base size is equal to the value of the BDP of the link. Accordingly, the value of the PIT base size needs to vary depending on the delayed round-trip time of transmitted data packets. For example, the overall network bandwidth may be utilized when the value of the PIT base size is larger for a case where the average delayed round-trip time of data packets is long than for a case where the average delayed round-trip time of data packets is short. In order to optimize the performance of the present invention, the PIT base size needs to be varied by taking into account the average delayed round-trip time of data packets that are transferred in real time. Therefore, the present invention proposes a new mechanism that detects a variation in the delayed round-trip time of data packets by monitoring the network queue of a router and then appropriately adjusts the PIT base size in accordance with a corresponding situation. The operation method of the corresponding mechanism is as follows. The router that monitors the network queue marks corresponding information in data packets when the size of the network queue exceeds a specific boundary. A router that has received a marked data packet appropriately varies the PIT base size by using the corresponding information. $b_{min}$ and $b_{max}$ are the boundary values of the network queue, and may be set as shown in Equations 8 and 9 below:

$$b_{min} = 0.5 * \alpha * max\_size \quad (8)$$

$$b_{max} = \alpha * max\_size \quad (9)$$

By using the corresponding mechanism, the present invention may exhibit predetermined performance regardless of a variation in the delayed round-trip time of data packets that are present over a link. Furthermore, the corresponding mechanism may operate without imposing a heavy load on the router because during data packet marking, it does not mark all data packets but marks only one data packet out of a specific boundary.

In order to implement the above-described content, a packet management apparatus according to the present invention may be a packet management apparatus functioning as a router in CCN, and may include a traffic prediction unit and a proactive congestion control unit. The traffic prediction unit may predict the amount of data traffic to be generated based on the number of forwarding information items present in a PIT. The proactive congestion control unit may probabilistically drop request packets based on the amount of data traffic predicted by the traffic prediction unit.

FIG. 7 is a view showing a process in which the proactive congestion control unit according to the present invention processes request packets in a router.

FIG. 8 is a view showing the operation of the router in which the proactive congestion control unit according to the present invention has received a NACK packet.

Since the operations of the traffic prediction unit and the proactive congestion control unit have been described above, a repeated description thereof will be omitted.

In the present invention, in order to evaluate performance, simulations were conducted using an ns-3 simulator (an ndnSIM module), and ICP, HIS, and AF were used as experimental control groups. The performance of the three functions (proactive congestion control, multipath transport, and producer-led differentiated services) of the present invention was evaluated using a total of three simulation scenarios. In all the simulations, maxP, α, and δ, i.e., the configurable parameters of the present invention that were used in common, were set to 0.1, 0.3, and 0.0025, respectively.

<Scenario 1—Single Path Transport>

Simulation Environment

In simulation scenario 1, the performance of the proactive congestion control of the present invention was evaluated in a single path transport environment. In corresponding simulation, there were used a dumbbell-shaped topology in which content consumers and content producers were connected to both ends of a single link, respectively. The bandwidth of the single link was set to 20 Mbps so as to function as a bottleneck link, and all of the content consumers and the content producers were connected to the single link, i.e., a bottleneck link, at 100 Mbps. Delayed round-trip time was set to 25 ms. 10,000 content items each having a size of 20 KB and the same prefix were used, the corresponding content items were requested by the content consumers according to an exponential distribution, and content request popularity was made to follow the Pareto distribution having an a value of 0.8. The simulation was conducted while varying corresponding content request rate between 20 and 100 requests/s. Additionally, eight content items, the size of each of which was infinite, were made to be present as background traffic over the link. The sizes of a network queue and request queues used in HIS and AF were all set to the bandwidth delay product (BDP).

Simulation Results

FIGS. 9A-9F show views depicting simulation results based on scenario 1.

Figure 9A:
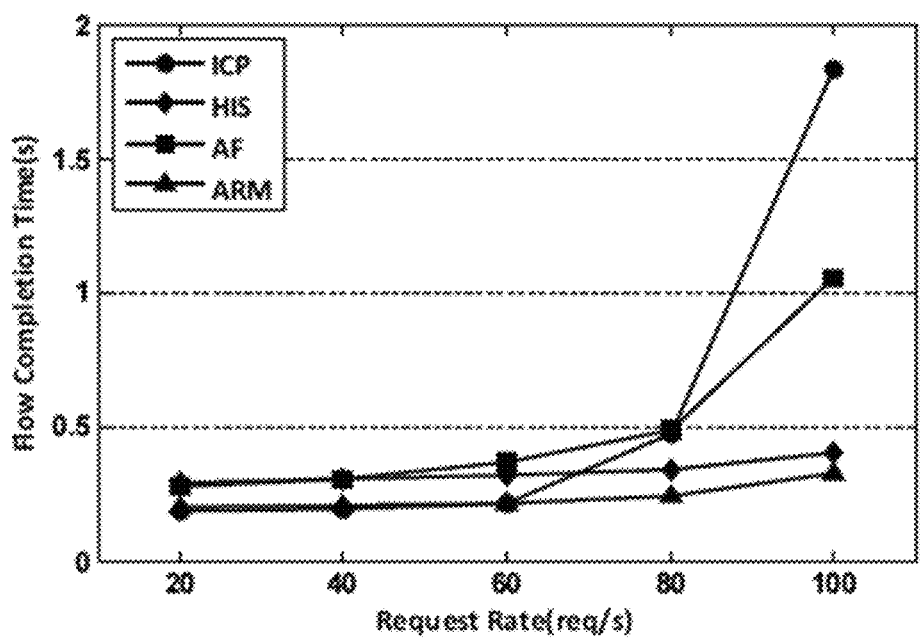
FIGS. 9A-9F show views depicting simulation results based on scenario 1.

FIG. 9A shows average transmission completion times for 20 KB content items. The active request management (ARM) of the present invention exhibited the most outstanding and stable performance at all request rates. Although HIS exhibited stable performance, it experienced a transmission completion time slightly longer than that in ARM. The HIS does not generate a NACK packet until the request queue is full, and thus the request queue is always full. Accordingly, HIS experiences a longer queue delay time than ARM that maintains the network queue at a level equal to or lower than a predetermined level. Although the ICP operated well when the request rate was in the range of 20 to 60 requests/s, the performance of the ICP was dramatically degraded at request rates equal to or higher than 80 requests/s. The reason for this is that data packet drops occurred as the request rate increased, and thus a loss recovery delay problem occurred. The performance of AF was degraded as the request rate increased. The reason for this is that in an environment in which all content items used the same prefix, a decrease in the upper limit value of the per-interface-per-prefix request rate resulting from the congestion of the transmission of a specific content item influenced the transmission of all the content items. Although the corresponding problem may be overcome by managing the upper limit value of the request rate in a per-interface-per-name manner other than a per-interface-per-prefix manner, managing network states for all respective request packet names is not a desirable solution because it may impose a very heavy load on the router.

Figure 9B:
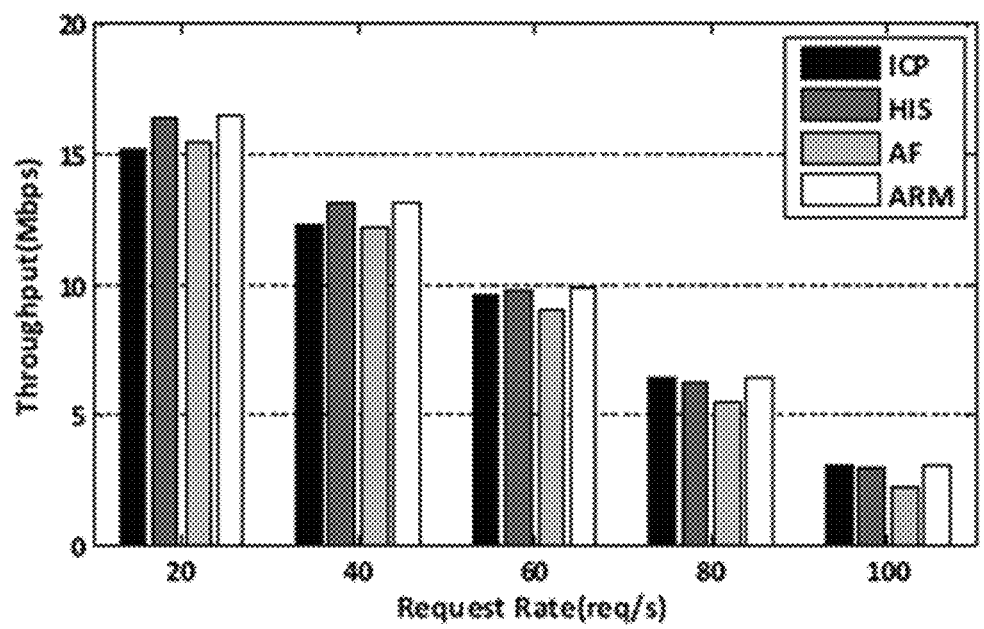

FIG. 9B is a graph showing the transmission throughputs of content items the size of each of which was infinite. The ARM and HIS achieved the highest throughputs at all request rates. Meanwhile, the ICP exhibited the lowest throughput in an environment to which a low request rate was applied. The ICP basically controls congestion based on delayed round-trip time, and thus makes the network queue be often almost empty by preventing the delayed round-trip time of packets from being increased to a large value. As a result, infinite content transmission could not sufficiently use the network queue in the competition against 20 KB content transmission, and thus a problem arouse in that the network throughput was considerably lowered. Although AF exhibited a higher throughput than the ICP, it exhibited lower performance than ARM and HIS. The reason for this is the same as the problem that occurs in the above-described management of the upper limit value of the per-interface-per-prefix request rate.

Figure 9C:
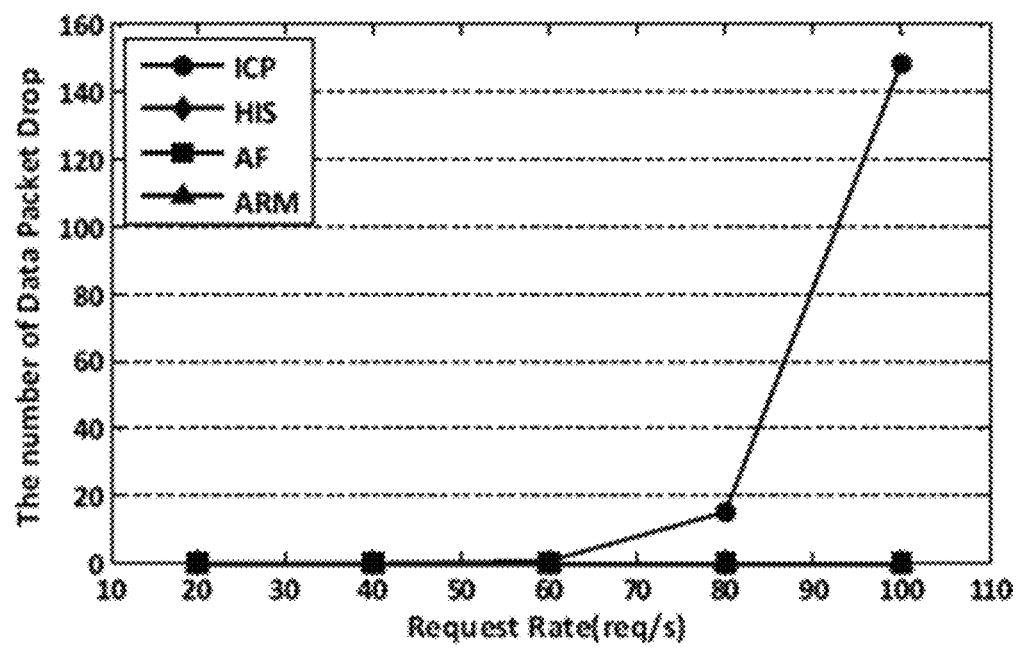
Figure 9D:
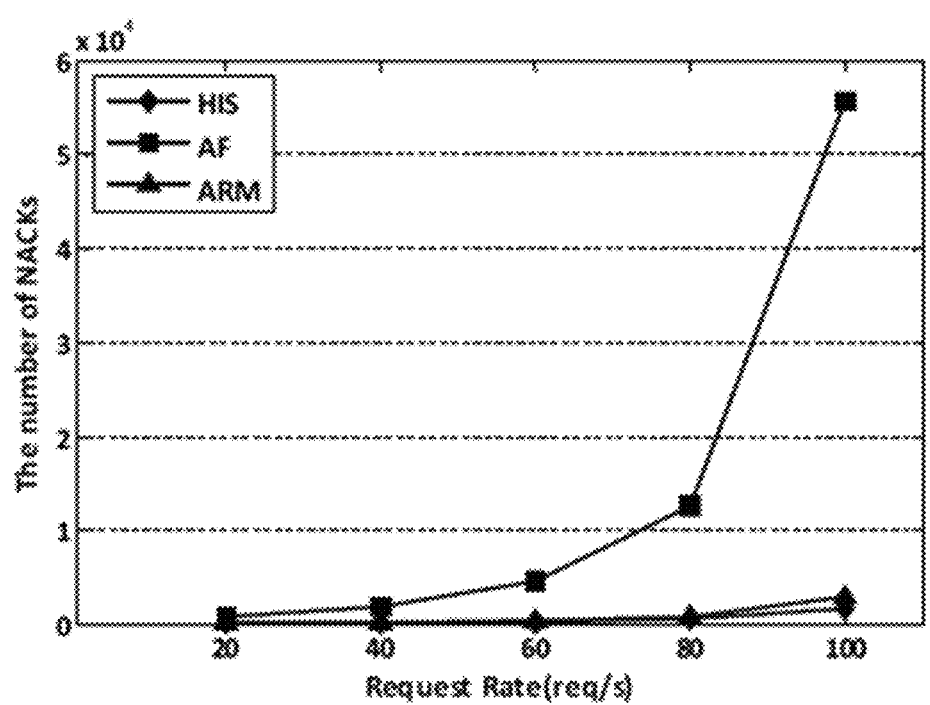

FIGS. 9C and 9D show the numbers of data packet drops and the numbers of NACK packets, respectively, for the respective models. Only the ICP experienced data packet losses, which cause loss recovery delay, in the range of 80 to 100 requests/s. The other models did not experience data packet losses because they dropped request packets in advance. The number of NACK packets for AF was significantly larger than those for HIS and ARM. The reason for this is that the decreased upper limit value of the request rate generated NACK packets for all the types of content transmission. Furthermore, the number of NACK packets for ARM was somewhat larger than HIS. The reason for this is that HIS generated NACK packets after the request queue was full but ARM probabilistically generated NACK packets before the network queue was full.

Figure 9E:
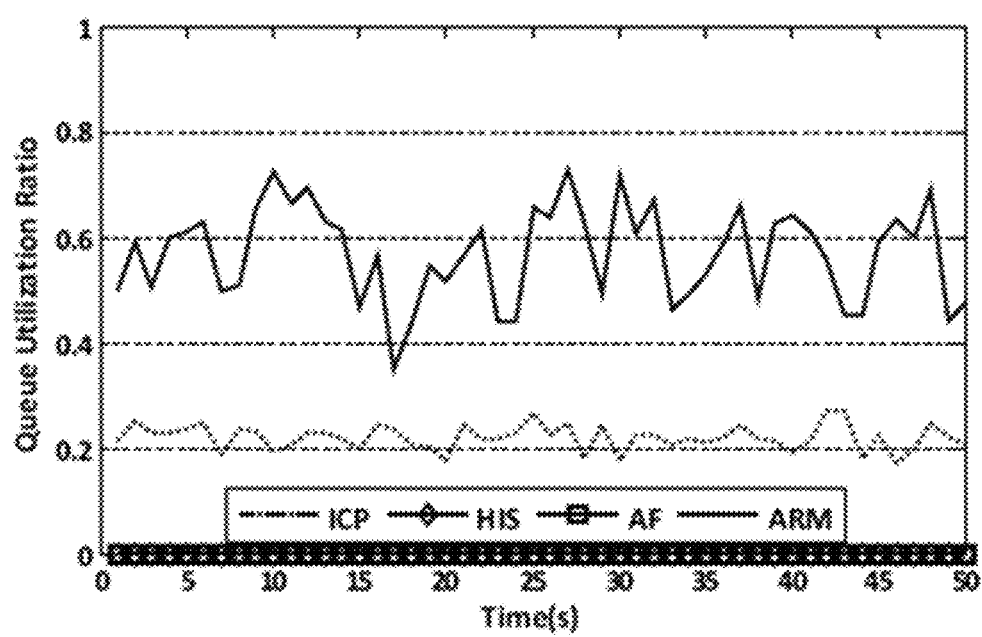
Figure 9F:
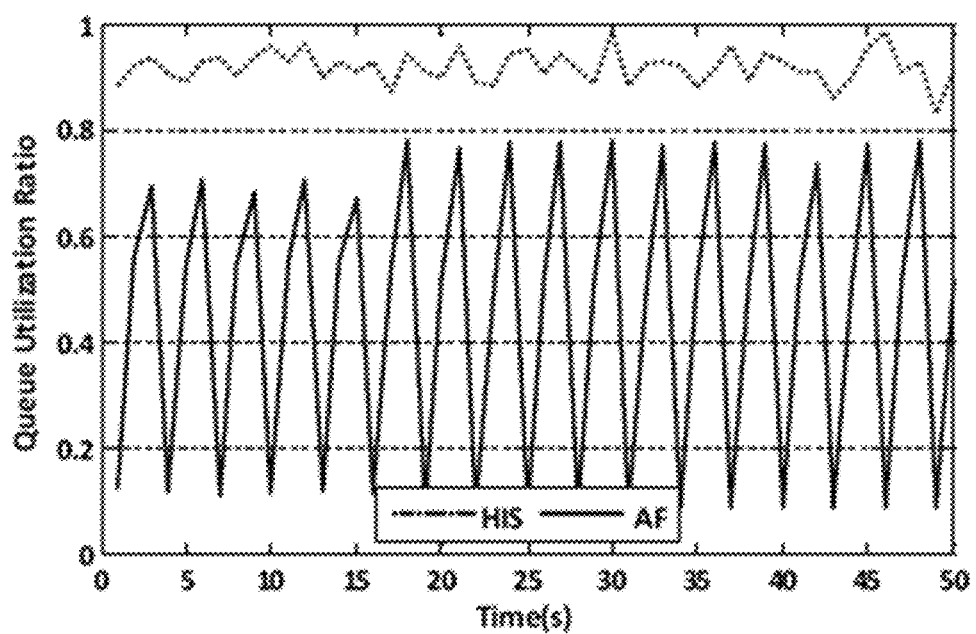

FIGS. 9E and 9F show network queue and request queue size variations for each model when 80 request packets were generated per second. Request queues were used only in AF and HIS. In connection with the network queue size variations, the network queue of ICP operated unstably while oscillating seriously, but ARM operated very stably while maintaining a predetermined level. Network queues were not used in HIS and AF because HIS and AF pace and transmit request packets. It can be seen that in connection with the request queue size variations, HIS was always full and AF oscillated seriously due to a variation in the upper limit value of the request rate.

<Scenario 2—Multipath Transport>
Simulation Environment

Figure 10:
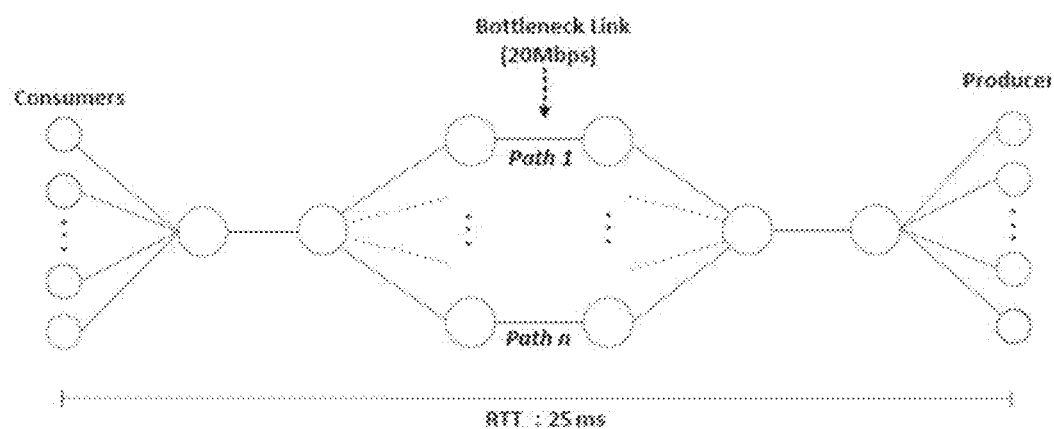
FIG. 10 is a view showing a topology used in scenario 2.

FIG. 10 is a view showing a topology that was used in scenario 2.

In scenario 2, to evaluate the efficiency of the multipath transport of ARM, simulation was conducted using a topology, such as that shown in FIG. 10. Eight content requestors requested content items the size of each of which was infinite. The simulation was conducted while varying the number of prefixes between one and eight during the simulation. The same number of content items were allocated for each of the prefixes. For example, when eight prefixes were used, all content items had different prefixes. When four prefixes were used, every pair of content items had the same prefix. Multiple paths with 20 Mbps bottleneck links were used. The simulation was conducted while varying the number of multiple paths between two and eight. The individual paths were referred to as path-1, path-2, . . . , path-8. Settings were made such that as the path number attached to "path-" was smaller, a corresponding path had a higher priority. Other conditions were the same as those used in scenario 1. Since ICP and HIS did not support multipath transport, ARM and AF were compared with each other in the simulation.

Simulation Results

FIGS. 11A-11D show views depicting simulation results based on scenario 2.

Figure 11A:
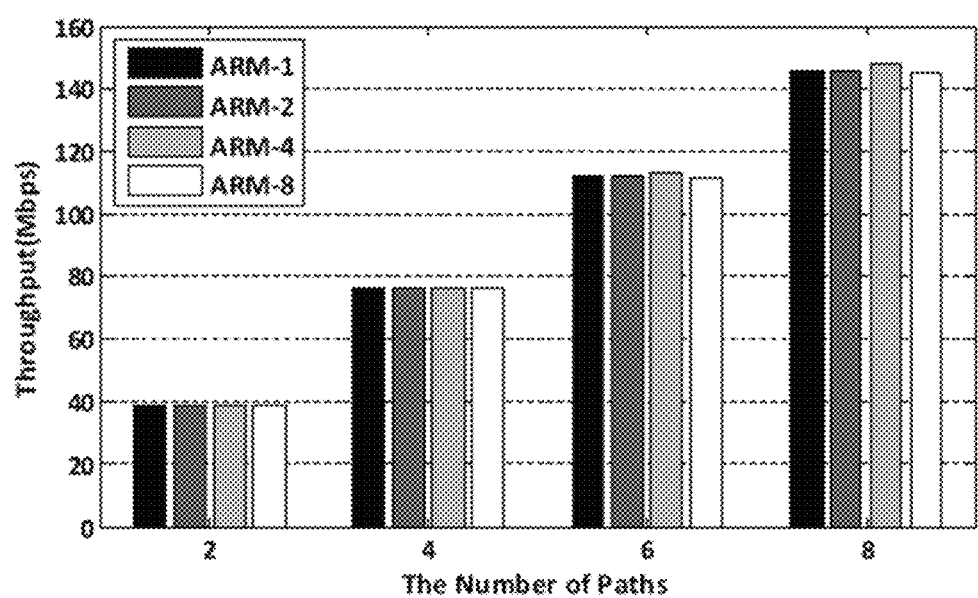
FIGS. 11A-11D show views depicting simulation results based on scenario 2.
Figure 11B:
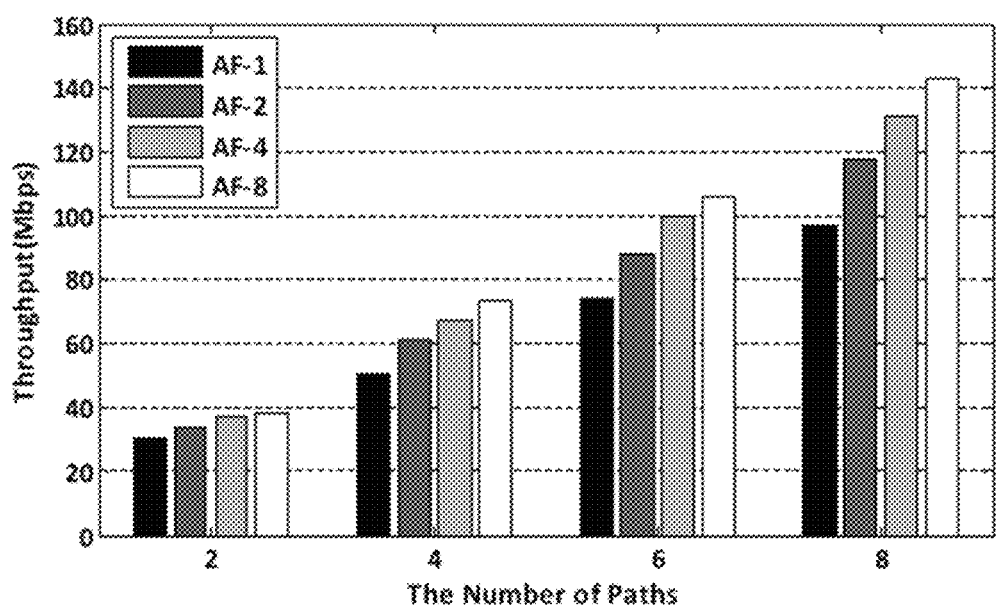

FIGS. 11A and 11B show the throughputs of ARM and AF for the numbers of prefixes in an environment in which two to eight multiple paths were used. The ARM and AF each using n prefixes were referred to as "ARM-n" and "AF-n," respectively. As the number of multiple paths was increased, both the two models exhibited increased throughputs. In this case, ARM always exhibited higher performance than AF. The ARM did not exhibit a variation in throughput attributable to a variation in the number of prefixes because it did not manage or utilize per-prefix prefix state information. In contrast, the throughput of AF varied depending on the number of prefixes because it utilized state information, i.e., the upper limit value of the per-prefix request rate. The throughput was increased as the number of prefixes increased. It was found that when eight prefixes were used, i.e., when the upper limit values of all content items were separately managed, performance similar to that of ARM was achieved. The reason for this is that a reduction in the upper limit value of the request rate attributable to specific content transmission influenced smaller content transmission as the number of prefixes increased.

Figure 11C:
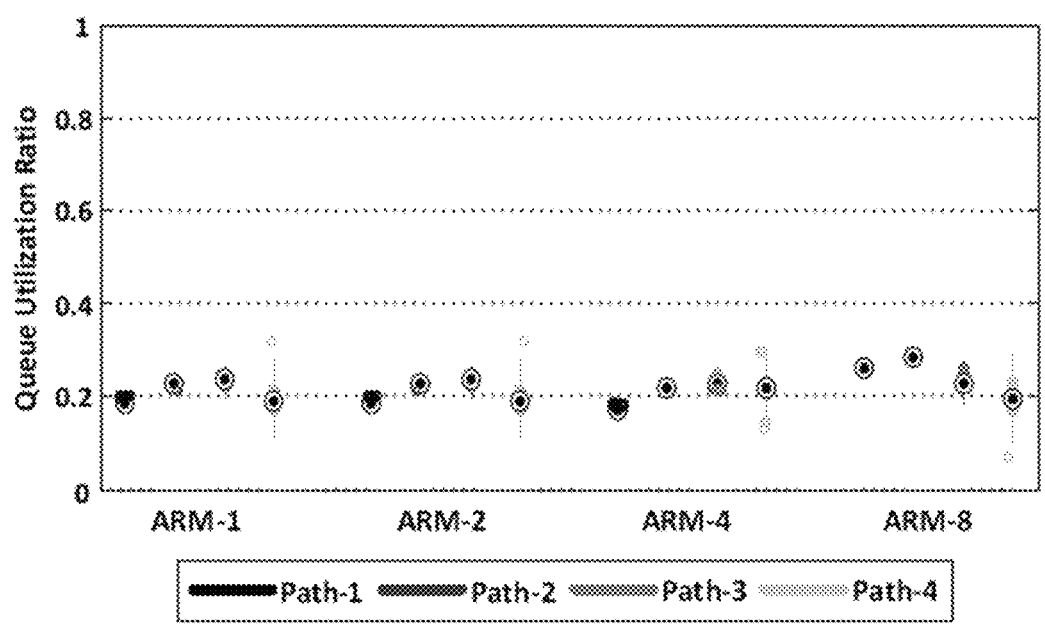

FIG. 11C shows network queue utilization for each path when ARM used four paths. AF did not use a network queue due to request packet pacing, and thus there was no network queue utilization. ARM stably used a network queue for each of the paths while maintaining a utilization of average 20% regardless of the number of prefixes. AF used a request queue in place of a network queue, as described above.

Figure 11D:
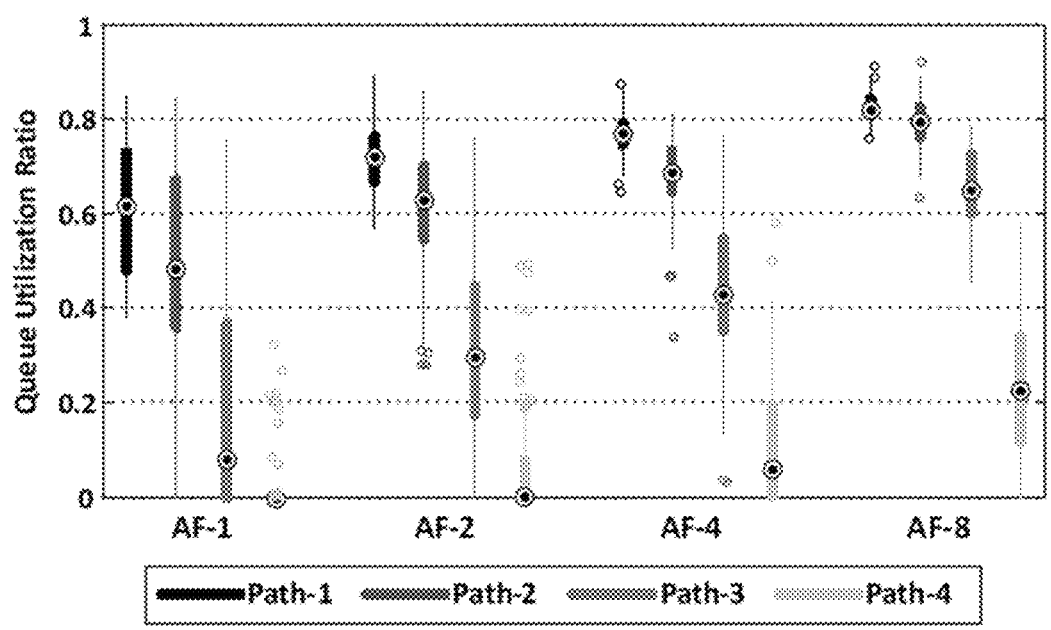

FIG. 11D shows the request queue utilization of AF. It can be seen that the request queue utilization of AF gradually became stable as the number of prefixes increased. However, in all cases, the network queue utilization of AF for path-3 and path-4 was lower than the network queue utilization of AF for path-1 and path-2. This was also caused by the management of the upper limit value of the per-interface-per-prefix request rate, and a side effect caused by the corresponding problem was mitigated as the number of prefixes increased. This unstable and unbalanced network queue utilization considerably degraded the throughput of AF compared to that of ARM.

<Scenario 3—Differentiated Service>

Simulation Environment

The last simulation was conducted to evaluate the performance of the differentiated services of ARM. Although a topology identical to that of scenario 1 was used, only two content producers were used. The individual content producers provided content items having different priorities. A content class having a higher priority was referred to as "assured forwarding," and a content class having a lower priority was referred to as "best_effort." A total of eight content requestors were present. Of these requestors, four requestors requested higher priority class content, and the remaining requestors requested lower priority class content. Furthermore, in this simulation, each of the content producers was made to request ten 20 KB content items per second as background traffic. In connection with the delayed round-trip times between the content requestors and the producers, the simulation was conducted while taking into account two cases. A case where assured forwarding content and best_effort content experienced the same delayed round-trip time of 25 ms and a case where the delayed round-trip times of assured forwarding content and best_effort content were 50 ms and 25 ms, respectively, were taken into account. The case where the same delayed round-trip time was experienced was referred to as a Same-RTT case, and the case where different delayed round-trip times were experienced was referred to as a Diff-RTT case.

The differentiated services of ARM were enabled by applying different threshold values minTH and maxTH to respective classes. In order to verify the validity of the approach, the influence of the difference between the threshold values of assured_forwarding and best_effort on the performance of ARM was examined in this simulation. For this purpose, in the corresponding simulation, β that influenced the threshold values of assured forwarding and best_effort was set to a specific constant value, and the difference between the β constant values of the two classes (β of assured_forwarding−β of best_effort) was varied and set between −0.25 and 0.25. Furthermore, finally, the performance of the adaptive β calculation algorithm proposed by the present invention was evaluated in this simulation. In this case, the target throughputs of assured_forwarding and best_effort were set to 15 Mbps and 5 Mbps, respectively. The measurement of throughput for each class and the update of β were performed every second.

Simulation Results

FIGS. 12A-12D show views depicting simulation results based on scenario 3.

Figure 12A:
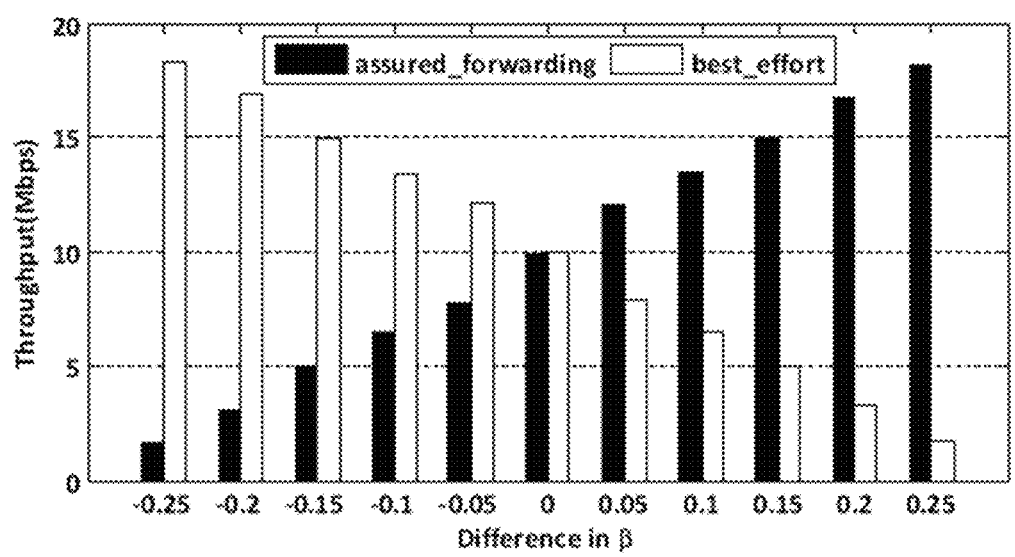
FIGS. 12A-12D show views depicting simulation results based on scenario 3.

FIG. 12A shows variations in throughput based on various β constant values in a Same-RTT environment. The x axis represents differences between the β constant values of assured forwarding and best_effort. When the corresponding difference was positive, the throughput of assured forwarding was larger than that of best_effort. In contrast, when the corresponding difference was negative, the throughput of assured_forwarding was smaller than that of best_effort. The difference in the throughput was increased as the difference between the β constant values increased.

Figure 12B:
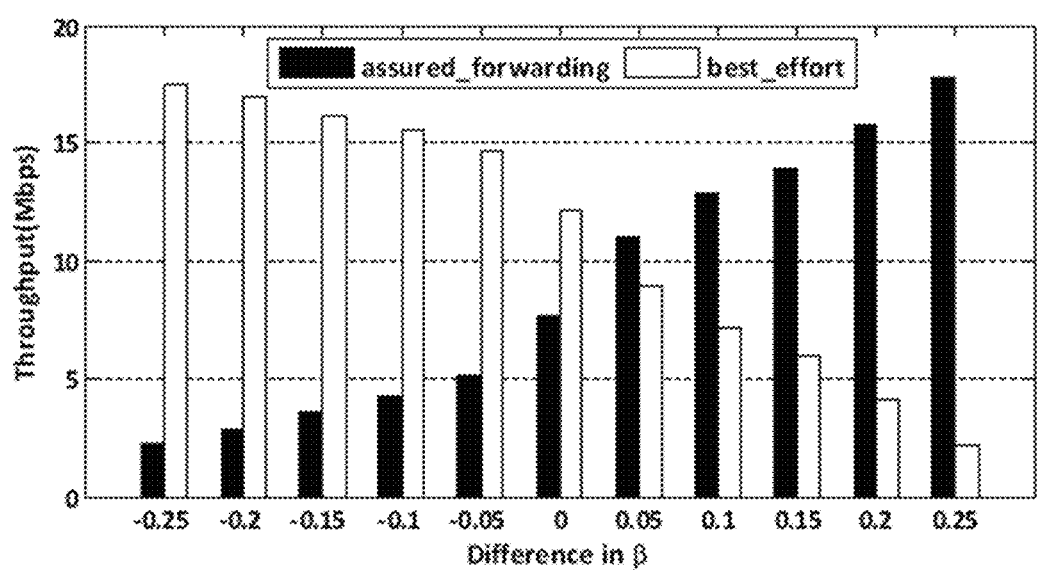

FIG. 12B shows the results of the same simulation performed in the Diff-RTT environment. In the Diff-RTT environment, when the difference between the β constant values was 0, the throughput of assured_forwarding was smaller than the throughput of best_effort, unlike in the Same-RTT environment. The reason for this is that the delayed round-trip time experienced by best_effort content transmission was shorter. However, the variation that appeared as the difference between the β constant values varied was similar to that in the Same-RTT environment. Through the corresponding simulation, the validity of the approach proposed by the present invention was verified by ascertaining that the throughputs of the respective classes could be differentiated by setting different threshold values for the respective classes and the extent of differentiation could be increased by increasing the difference between the threshold values of the classes.

Figure 12C:
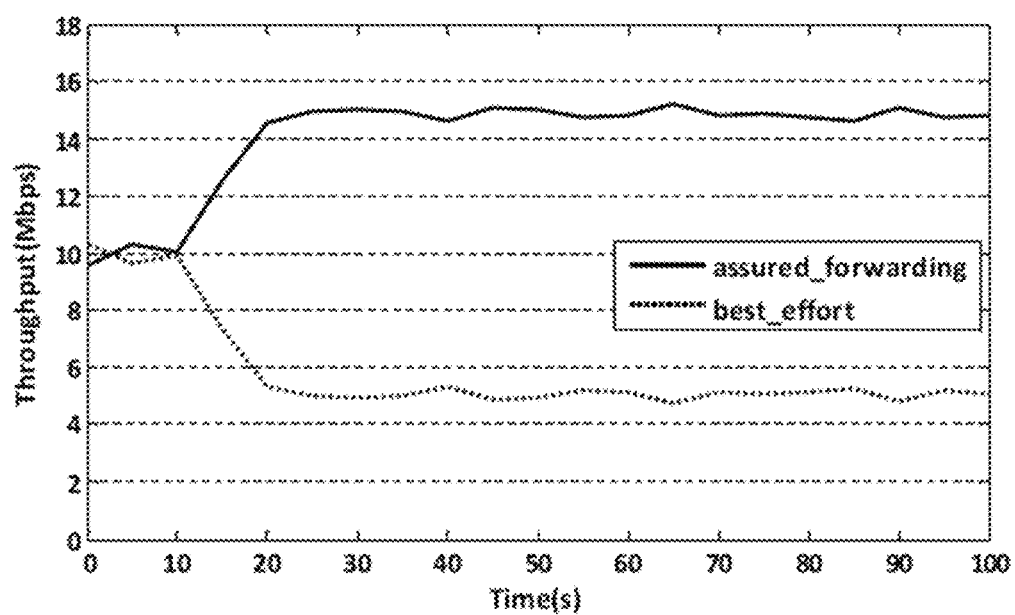
Figure 12D:
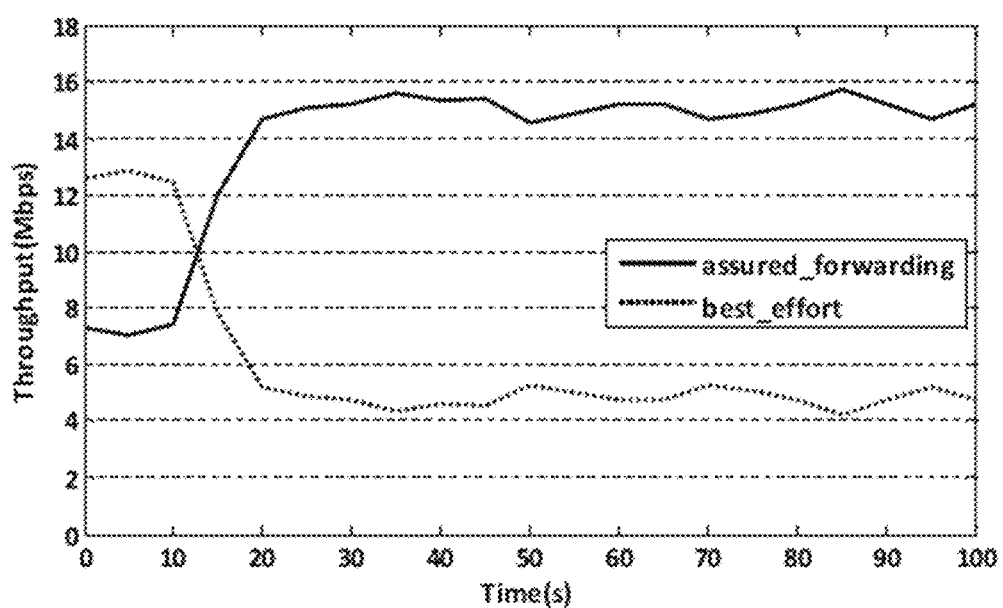

FIGS. 12C and 12D are graphs showing the results of simulation that was conducted by applying the adaptive β calculation algorithm proposed by the present invention. The graphs show throughput variations in the Same-RTT and Diff-RTT environments. In both the graphs, the differentiated services started at 10 s. In both the cases, target throughputs were achieved immediately after differentiated service functions were executed, and then stable target throughputs were maintained.

The simulations have shown that the present invention significantly outperforms the conventional technology in the single path and multipath environments and imposes a smaller load on routers than conventional technology while utilizing existing CCN routers without requiring the installation of additional queues. Accordingly, the present invention will become a next generation congestion control technology for CCN, and will become a base technology for congestion control technologies operating in all network architectures that perform stateful forwarding other than CCN. Furthermore, the present invention may stably provide content producer-led differentiated services, thereby increasing the coverage and practicality of the differentiated services.

The present invention may significantly improve the performance of CCN by effectively providing single path transport and multipath transport in CCN. The present invention may provide excellent scalability because it does not require the installation of additional queues or a heavy load from a router in the provision of corresponding functionality. Additionally, the present invention may increase the practicality of differentiated services by presenting a new content producer-centric approach in the provision of the differentiated services.

The advantages of the present invention are not limited to the above-described advantages, and other advantages that have not been described will be readily apparent to those skilled in the art from the foregoing description.

The embodiments described herein and the accompanying drawings are intended merely to illustrate part of the technical spirit included in the present invention. Accordingly, the embodiments disclosed herein are not intended to limit the technical spirit of the present invention, but are intended to illustrate the technical spirit. Therefore, it will be apparent that the scope of the technical spirit of the present invention is not limited by the embodiments. All modifications and specific embodiments which can be easily derived by those skilled in the art within the range of the technical spirit included in the present specification and the accompanying drawings should be construed as falling within the range of the rights of the present invention.

What is claimed is:

1. A packet management apparatus for functioning as a router in content-centric networking (CCN), the packet management apparatus comprising:

a traffic prediction unit configured to predict an amount of data traffic to be generated based on a number of forwarding information items present in a pending interest table (PIT); and a proactive congestion control unit configured to probabilistically drop request packets (interests) based on the amount of data traffic predicted by the traffic prediction unit and generate a Negative Acknowledgement (NACK) packet when dropping the request packets in the router, wherein the proactive congestion control unit, when receiving the NACK packet, generates a request packet corresponding to the corresponding NACK packet and forwards the generated request packet to an interface having a rank next to a rank of an interface via which the NACK packet has entered.

2. The packet management apparatus of claim 1, wherein the proactive congestion control unit generates a NACK packet when there is no interface available for forwarding.

3. The packet management apparatus of claim 1, wherein the proactive congestion control unit drops the request packets based on service classes of the request packets in a differentiated probabilistic manner.

4. The packet management apparatus of claim 1, wherein the traffic prediction unit sets a value of a PIT base size based on delayed round-trip times of data packets.

5. A packet management method for controlling a router in content-centric networking (CCN), the packet management method comprising the steps of:

(a) predicting, by a traffic prediction unit, an amount of data traffic to be generated based on a number of forwarding information items present in a pending interest table (PIT);

(b) probabilistically dropping, by a proactive congestion control unit, request packets (interests) based on the amount of data traffic predicted by the traffic prediction unit;

(c) generating, by the proactive congestion control unit, a Negative Acknowledgement (NACK) packet after dropping the request packets in the router; and (d) when receiving the NACK packet, generating, by the proactive congestion control unit, a request packet corresponding to the corresponding NACK packet and forwarding, by the proactive congestion control unit, the generated request packet to an interface having a rank next to a rank of an interface via which the NACK packet has entered.

6. The packet management method of claim 5, wherein step (c) comprises the step of generating, by the proactive congestion control unit, a NACK packet when there is no interface available for forwarding.

7. The packet management method of claim 5, wherein step (b) comprises the step of dropping, by the proactive congestion control unit, the request packets based on service classes of the request packets in a differentiated probabilistic manner.

8. The packet management method of claim 5, wherein step (a) comprises the step of setting, by the traffic prediction unit, a value of a PIT base size based on delayed round-trip times of data packets.

9. A computer program written to execute the steps of the packet management method of claim 5 on a computer and stored on a non-transitory computer-readable storage medium.

* * * * *